No. 663,302. Patented Dec. 4, 1900.
F. F. STOWE.
VEHICLE HUB.
(Application filed Mar. 1, 1900.)
(No Model.)
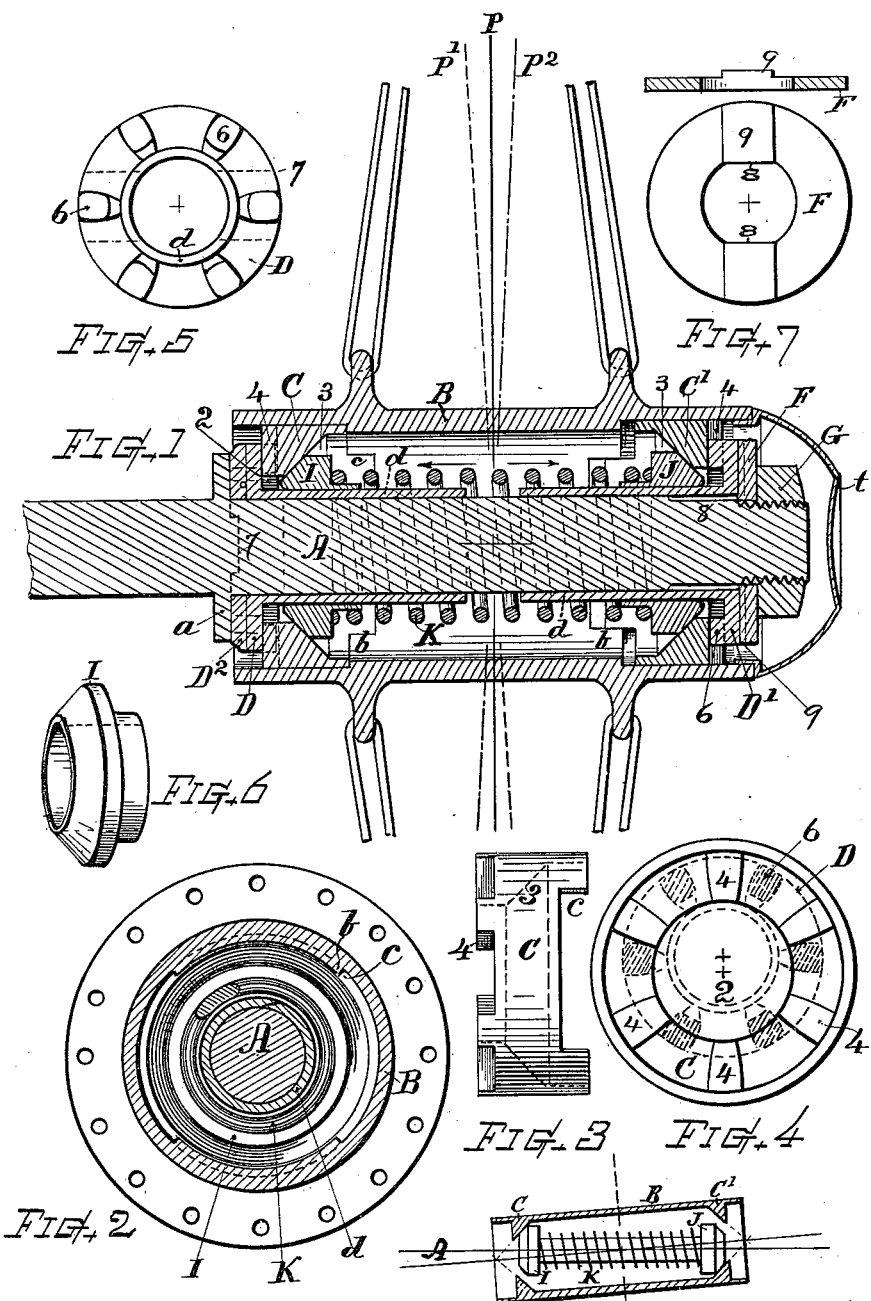

UNITED STATES PATENT OFFICE.

FERNANDO F. STOWE, OF WORCESTER, MASSACHUSETTS.

VEHICLE-HUB.

SPECIFICATION forming part of Letters Patent No. 663,302, dated December 4, 1900.

Application filed March 1, 1900. Serial No. 6,905. (No model.)

*To all whom it may concern:*

Be it known that I, FERNANDO F. STOWE, a citizen of the United States, residing at Worcester, in the county of Worcester and State of Massachusetts, have invented a new and useful Vehicle-Hub, of which the following, together with the accompanying drawings, is a specification sufficiently full, clear, and exact to enable persons skilled in the art to which this invention appertains to make and use the same.

My present invention relates to a novel construction in vehicle-hubs, more especially designed for motor-carriages or automobile vehicles, but applicable to other kinds of road vehicles, carriages, or trucks, and by which a hub is provided having means for affording within itself a non-rigid or yielding support for the outer parts and body of the wheel and which while normally maintaining the plane of the wheel perpendicular with the axis will permit limited resilient vibration of said wheel-plane without strain or shock upon the axial parts, as more fully hereinafter explained, the prime object being to provide a vehicle-wheel hub that will in a great measure overcome the effects of rough roading and prevent the transmission to the carriage or motor mechanism of the shocks and jars occasioned by the wheel contact with impediments and irregularities on the roads or when running over uneven surfaces or rough pavements.

Another object is to provide a vehicle-hub having means for affording an efficient centering-support for its outer shell or barrel and a yielding action of the character described and adapted for instantly returning the parts to normal position of axial coincidence as the occasion of yielding is passed.

Another object is to provide a vehicle-hub adapted for affording a yielding or rocking action of its outer shell or barrel independently of the inner parts and means for coupling or uniting the parts to effect rotation thereof in conjunction with the central core, axle, or shaft by which power is transmitted to the hub and wheel.

These objects I attain by the mechanism illustrated in the drawings, wherein Figure 1 represents a longitudinal central section of a vehicle-hub embodying my invention. Fig. 2 is a transverse section of the same. Fig. 3 is a side view of one of the socket members. Fig. 4 represents the outer face of the socket member within the barrel, with dotted lines indicating the relation of the clutch-teeth when the yielding action is effected. Fig. 5 represents the inner face of the clutch-ring. Fig. 6 is a view of one of the sliding spring-actuated cones. Fig. 7 shows the face and section of the retaining-washer, and Fig. 8 is an outline diagram illustrating the manner of yielding operation.

Referring to the drawings, the letter A indicates the center shaft or axle, which may be either solid or tubular, and as in the case of a motor-vehicle it can be a rotatable drive-shaft for rotating the hub and wheel, or in other instances the hub can be made to revolve upon the axle. As here illustrated this axle or shaft A is assumed to be a drive-shaft rotated by the carriage-motor.

B indicates the outer shell, barrel, or body of the hub, provided on its periphery with suitable flanges or means for attaching or supporting spokes that carry the rim of the wheel in any suitable or well-known manner and maintaining the same properly in a plane perpendicular with said body, as will be understood. The central plane of the wheel and hub-body B is indicated by the line P.

C and C' indicate two annular oppositely-disposed socket members fitted within the body B near its end and having a central eye or opening 2 therethrough of greater diameter than the axle or cylindrical parts which pass through said opening, so as to permit lateral movement thereon, said members having formed on their inner faces inwardly-conoidal seats or inclines 3, and on their outer faces provided with clutch-teeth 4 or suitable engaging means, while their rims are notched, as at c, or fitted to interlock with lugs b, formed on the interior of the body B, whereby said parts are secured together for unitary rotative action.

D and D' indicate clutch rings or devices of smaller diameter than the interior of the body-shell B and preferably provided with cylindrical bearing-sleeves d, that embrace and extend inward along the shaft or axle A for supporting the clutch-rings perpendicular thereto. Said clutch-rings D D' are provided with engaging detents or teeth 6, that intermesh with those on the socket members.

D² indicates a plate fixed to or forming a part of the clutch-ring D and having a suitable interlock lug or groove 7 for engagement with a flange a, formed on the shaft or axle to convey power and motion therefrom to the hub. The clutch D can, if in any instance desired, be made integral with the flange a; but to facilitate the fitting up of the engaging detents it is preferable to have the clutch-ring separable from the flanges.

F indicates a plate or washer non-rotatively arranged on the axle end, as by flattened surfaces 8, and having a suitable interlock groove or rib 9 for engagement with the clutch-ring C'. The parts of the hub are confined endwise between the end bearing-surfaces of the flanges or plates and are retained in connection with the axle by a suitable fastening device at the outer end of the axle, as a nut G screwed onto the threaded end thereof.

I and J indicate two oppositely-directed longitudinally-sliding cones or incline-faced pressers supported on the center axis or the bearing-sleeve d and respectively fitting into the conoidal seats 3 of the opposite socket members C and C', and K indicates a strong coiled-wire spring arranged about the axis and inner cylindrical parts within the body, with its ends seated against the respective sliding cones I and J and acting thereon by expansive tension to press said cones forcibly into the sockets, thereby centering and supporting the respective ends of the outer body B and normally maintaining the body concentric with the axis, except when some counteracting force momentarily overcomes the effect of the spring.

The degree of inclination for the surfaces 3 of the cones and sockets can be varied in different instances for meeting any requirements of different kinds of vehicle-hubs, the faces being made more or less oblique in relation to the axis-line, or in some instances the inclined surfaces may be made slightly curved or approaching a spherical conformation of surface.

The socket member C can be made solid with or permanently secured in the body B; but the socket member C' is best fitted into the body so as to be endwise adjustable therein to permit variation of the spring-pressure by screwing the nut G more or less upon its thread and to be removable from the body to facilitate the assembling of the cones and spring parts within the body.

In a vehicle-hub of the improved construction herein set forth the outer portion or barrel B is supported by the oppositely-disposed socket members C C' and cones I and J, having the countermatching surfaces and maintained normally central or in coincident axial alinement with the shaft by the force and endwise pressure of the spring K. Thus when the wheel strikes impediments or irregularities in the roadway, giving shock and strain tending to vary the plane of the wheel, as from line P to line P' or P², Fig. 1, the hub affords a yielding action by the inclined surfaces transferring the strain to the spring K, which allows the inclines to resiliently give way by the compression of the spring, as illustrated in diagram Fig. 8, and to then spring back to normal position, thereby relieving or exhausting the vibrative force or shock upon the spring K or within the wheel-hub instead of transmitting its full effect to the axle or shaft and thence to the motor mechanism.

If it is desired that this hub be made to revolve on a non-rotatable shaft or axle, then the engaging lugs at 7 and 9 may be omitted and the sleeves d united to form the bearing-surface upon the axle or upon a suitable tubular lining within them, and ball-bearing devices, as may be desired, can be employed therewith without material change in the essential features of my invention.

What I claim as of my invention, and desire to secure by Letters Patent, is—

1. A vehicle-hub comprising an outer tubular body adapted for carrying the wheel-spokes, and having internally parallel end openings, an inner bearing portion adapted for support upon the axle-shaft, the removable annular internally-coned supporting members disposed between said body and bearing portions and adjustable endwise within the tubular body, means for rotatively uniting said supporting members and body, two longitudinally-movable cones mounted on said inner bearing portion and centering in said supporting members with counter-matching conoidal or inclined surfaces, an endwise-resistance spring acting against said movable cones to yieldingly force the conoidal surfaces together, an axle or shaft provided with a shoulder or bearing-plate and a movable end bearing plate or collar limiting the length of space within which said supporting members are embraced, and means for adjusting said collar to carry one annular supporting member toward or from the other, for varying the effective tension of said resistance-spring.

2. In a vehicle-hub, the combination, with an outer body comprising a tubular shell or barrel, the inner or bearing portions, and an axle-shaft having non-yielding end bearing plates or surfaces between which the hub devices are endwise confined; of two oppositely-disposed socket members removably inserted within and respectively supporting the ends of said body, one of said socket members slidable endwise in the body-shell, but rotatively united therewith, a pair of longitudinally-sliding cones countermatching with said socket members by conoidal or inclined surfaces, and a spring acting against said sliding cones to yieldingly force them against the socket members and the latter against the end bearing surfaces, thereby normally maintaining the parts in close relation and permitting yield of said slidable socket member when the body assumes oblique displacement, substantially as set forth.

3. The combination with the body or spoke carrying shell, and the axle-shaft; of oppositely-disposed socket members non-rotatably confined within said body, concentrically-supported sliding cones intermatching with said socket members, an expanding-spring pressing against said cones, and clutch devices connecting said socket members for rotation with the axle or shaft, for the purposes set forth.

4. The combination, of the outer body or shell, the socket members having interior conoidal seats and exterior clutch-detents, one of said members firmly secured within the body, the other non-rotatable but capable of endwise movement therein, the clutch-rings having bearing-sleeves supported on the center shaft, core or axle, and provided with teeth that loosely engage with said socket members, and means for interlocking said clutch-rings with the axle, a pair of sliding cones concentrically mounted on the center or bearing sleeve, and a coiled-wire spring disposed about the axial center and exerting expansive pressure oppositely against said cones.

Witness my hand this 26th day of February, 1900.

FERNANDO F. STOWE.

Witnesses:
CHAS. H. BURLEIGH,
AARON F. STOWE.